United States Patent
Kimura et al.

(10) Patent No.: US 8,077,715 B2
(45) Date of Patent: Dec. 13, 2011

(54) CONTENT TRANSMITTING APPARATUS, CONTENT RECEIVING APPARATUS, CONTENT TRANSMITTING METHOD, AND CONTENT RECEIVING METHOD

(75) Inventors: Hiroaki Kimura, Shinjuku (JP); Shingo Izawa, Shinjuku (JP); Takaaki Ishida, Fujisawa (JP); Kotaro Kataoka, Fujisawa (JP)

(73) Assignees: KDDI Corporation, Tokyo (JP); Keio University, Tokyo (JP)

( * ) Notice: Subject to any disclaimer, the term of this patent is extended or adjusted under 35 U.S.C. 154(b) by 254 days.

(21) Appl. No.: 12/088,592

(22) PCT Filed: Sep. 28, 2006

(86) PCT No.: PCT/JP2006/319333
§ 371 (c)(1),
(2), (4) Date: Mar. 28, 2008

(87) PCT Pub. No.: WO2007/037334
PCT Pub. Date: Apr. 5, 2007

(65) Prior Publication Data
US 2009/0245250 A1   Oct. 1, 2009

(30) Foreign Application Priority Data
Sep. 28, 2005   (JP) ................................ 2005-282441

(51) Int. Cl.
*H04L 12/28* (2006.01)
(52) U.S. Cl. ...................................................... 370/390
(58) Field of Classification Search .................... 370/390
See application file for complete search history.

(56) References Cited

U.S. PATENT DOCUMENTS

| | | | |
|---|---|---|---|
| 6,262,721 B1* | 7/2001 | Tsukidate et al. | 715/721 |
| 6,571,392 B1* | 5/2003 | Zigmond et al. | 725/110 |
| 2002/0026645 A1* | 2/2002 | Son et al. | 725/117 |
| 2002/0057335 A1* | 5/2002 | Tsukada et al. | 348/14.01 |
| 2002/0160758 A1* | 10/2002 | Pradhan et al. | 455/414 |
| 2003/0156582 A1* | 8/2003 | Belgaied et al. | 370/389 |

(Continued)

FOREIGN PATENT DOCUMENTS
EP   1424853 A1   6/2004
(Continued)

OTHER PUBLICATIONS

European Standard ETSI EN 302304 v1.1.1 (Nov. 2004) Digital Video Broadcasting (DVB), Transmission System for Handheld Terminals (DVB-H).*

(Continued)

*Primary Examiner* — Ayaz Sheikh
*Assistant Examiner* — Hai-Chang Hsiung
(74) *Attorney, Agent, or Firm* — Westerman, Hattori, Daniels & Adrian, LLP

(57) ABSTRACT

A content transmitting apparatus includes a content transmitting unit (111) that IP packetizes content to be transmitted through a communication network (101), and an encapsulating unit (112) that encapsulates the content IP packetized by the content transmitting unit (111) to generate a transmission packet to be transmitted through a broadcast network (102) for digital broadcast media. The content transmitting unit (111) and the encapsulating unit (112) transmit plural content items by IP multicast. The content transmitting unit (111) adds, to a header of the content to be IP packetized, information concerning a condition of a receiving side node of the content.

9 Claims, 7 Drawing Sheets

U.S. PATENT DOCUMENTS

| | | | |
|---|---|---|---|
| 2004/0044911 A1* | 3/2004 | Takada et al. | 713/201 |
| 2005/0032528 A1* | 2/2005 | Dowling et al. | 455/456.1 |
| 2005/0153650 A1* | 7/2005 | Hikomoto | 455/3.01 |

FOREIGN PATENT DOCUMENTS

| | | | |
|---|---|---|---|
| EP | 1455294 A2 | 9/2004 | |
| JP | 10-75219 A | 3/1998 | |
| JP | 2002-261760 A | 9/2002 | |
| JP | 2003-69514 A | 3/2003 | |
| JP | 2003-78830 A | 3/2003 | |
| JP | 2004-5339 A | 1/2004 | |
| JP | 2004-72551 A | 3/2004 | |
| JP | 2004-274562 A | 9/2004 | |
| JP | 2004-297628 A | 10/2004 | |
| WO | 2004-080011 A1 | 9/2004 | |

OTHER PUBLICATIONS

ETSI EN 302 304 V1.1.1. (Nov. 2004); Digital Video Broadcasting (DVB); Transmission System for Handheld Terminals (DVB-H); European Broadcasting Union. Cited in the ISR.

International Search Report of PCT/JP2006/319333, date of mailing: Oct. 31, 2006.

International Preliminary Report on Patentability for Application No. PCT/JP2006-319333 mailed on Apr. 10, 2008.

Korean Office Action dated Aug. 16, 2010, issued in corresponding Korean Patent Application No. 10-2008-7007411.

Hong, Teh Chee et al.; "A Comparison of IP Datagrams Transmission using MPE and ULE over Mpeg-2/DVB Networks"; 2005 5th International Conference on Information Communications & Signal Processing (ICICS) : Bangkok, Thailand, Dec. 6-9, 2005, Piscataway, NJ: IEEE Operations Center, Dec. 6, 2005, pp. 1173-1177, XP002572964.

Sooriyabandara, Mahesh et al.; "A lightweight encapsulation protocol for IP over MPEG-2 network: design, implementation and analysis"; Computer Networks, Elsevier Science Publishers B.V., Amsterdam, NL LNKD-DOI:10.1016/J.Comnet . 2004. 10. 006, vol. 48, No. 1, May 16, 2005, pp. 5-19, XP004809231.

Supplementary European Search Report dated Mar. 2, 2011, issued in corresponding European Patent Application No. 06810780.4.

"Digital Video Broadcasdting (DVB); DVB specification for data broadcasting; ETSI EN 301 192", ETSI Standards, LIS, Sophia Antipolis Cede, France, vol. BC, No. V1.4.1, Nov. 1, 2004, XP014026918, pp. 14-37.

"Digital Video Broadcasting (DVB); DVB-H Implementation Guidelines; ETSI TR 102 377", ETSI Standards, LIS, Sophia Antipolis Cedex, France, vol. BC, No. V1.1., Feb. 1, 2005, XP014027140.

* cited by examiner

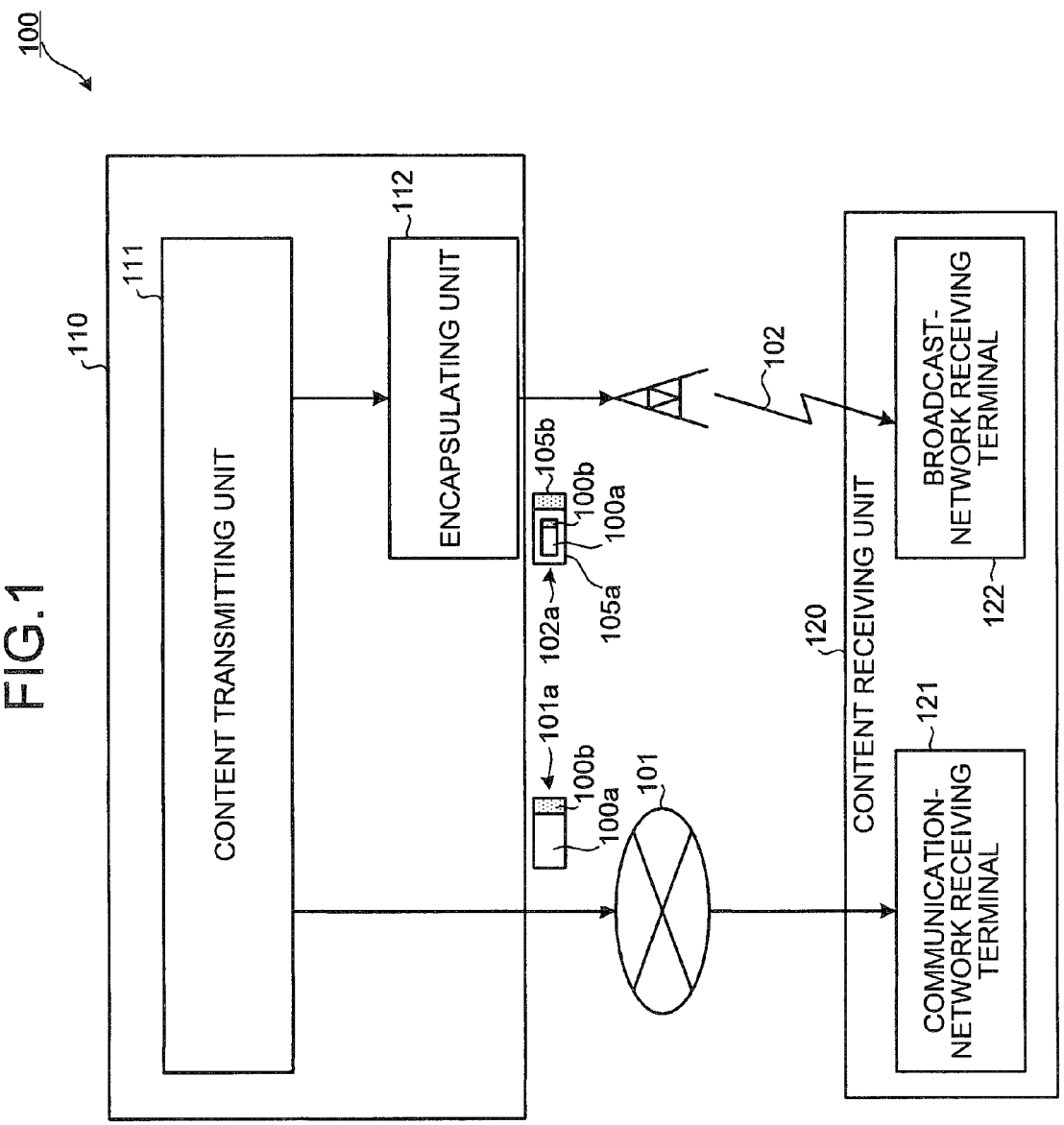

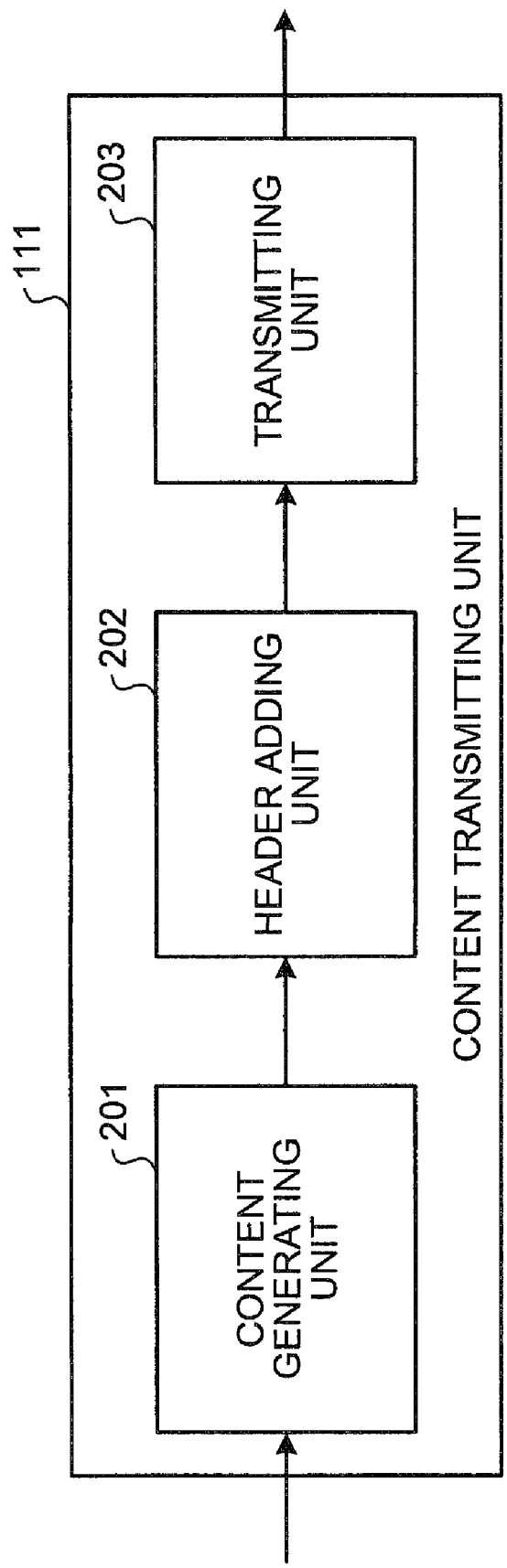

CONTENT TRANSMITTING APPARATUS, CONTENT RECEIVING APPARATUS, CONTENT TRANSMITTING METHOD, AND CONTENT RECEIVING METHOD

TECHNICAL FIELD

The present invention relates to a content transmission apparatus that, for each content item, can limit recipients for the content, and more particularly to a content transmitting apparatus, a content receiving apparatus, a content transmitting method, and a content receiving method that can transmit, to a user, the same content through both a communication network and a broadcast network.

BACKGROUND ART

Conventionally, the digitalization of programs broadcasted through a broadcast network, such as that for terrestrial broadcasts, is progressing and the distribution of broadcast content by utilizing high-capacity and high-speed properties of communication networks, such as the Internet, has been gaining momentum.

In digital broadcasts of recent years, data can be transferred through bidirectional communication between a transmitter and a receiver. This technology enables data to be transferred through the Internet, and a digital-broadcast receiving apparatus receiving a digital broadcast obtains information concerning a bidirectional web server relevant to the corresponding broadcast content, and communicates with the web server through the Internet, etc. (see, for example, Patent Document 1 below).

Patent Document 1: Japanese Patent Application Laid-open Publication No. 2003-78830

DISCLOSURE OF INVENTION

Problem to be Solved by The Invention

However, with the conventional technology above, a transmitter cannot transmit the broadcast content to a user through various transmission media without changing the broadcast content to an appropriate format according to each transmission medium, which differs according to the broadcast network or communication network.

Presently, there is a problem in that most of the broadcast programs broadcasted through a broadcast network and the broadcast content distributed through a communication network, such as the Internet, are independently produced and the program content is limited to each respective transmission medium. Hence, same content cannot be transmitted through both the broadcast network and the communication network. Furthermore, two different apparatuses are required, one of which plays the content distributed through the communication network, and the other of which plays the content received through the broadcast network.

Furthermore, a viewer cannot watch programs that satisfy viewer preference or circumstantial factors without a conscious effort and must perform some operation such as changing a channel. For example, if a recipient is traveling while receiving content and circumstances change, such as when the recipient is driving and the position of the recipient changes from the mountains to the coast, and the recipient wants to change the program or music in play to suite the present mood and new surroundings, the recipient must select a channel.

Additionally, to transmit a program with the viewer in mind, broadcast stations have served viewer needs by adjusting broadcast times based on program scheduling or by utilizing a subchannel. However, there is a problem in that it is difficult to automatically distribute a program according to viewer surroundings and circumstances that vary dynamically.

To solve the above problems, it is an object of the present invention to propose a content transmitting apparatus, a content receiving apparatus, a content transmitting method, and a content receiving method that can transmit content compliant with the requirements of the receiving side regardless of the medium of transmission, i.e., a broadcast network or a communication network.

Means for Solving Problem

To solve the above problems and achieve the object, a content transmitting apparatus according to the invention of claim 1, includes an IP packetizing unit that packetizes content and adds an IP header to the content; a communication-network transmitting unit that transmits, through a communication network, the content packetized by the IP packetizing unit; an encapsulating unit that encapsulates the content packetized by the IP packetizing unit to generate a transmission packet to be transmitted through a broadcast network for digital broadcast; and a broadcast-network transmitting unit that transmits the transmission packet encapsulated by the encapsulating unit, in which the communication-network transmitting unit and the broadcast-network transmitting unit transmit a plurality of content items by IP multicast, and the IP packetizing unit, to a header of the content to be IP packetized, adds information concerning a condition of a receiving side node of the content.

A content transmitting apparatus according to the invention of claim 2, in the invention of claim 1, the information concerning a condition of the receiving side node includes a current position on the receiving side, a recipient attribute, or a recipient preference.

A content receiving apparatus according to the invention of claim 3, includes a broadcast-network receiving unit that receives, from a broadcast network, a transmission packet in which an IP packet of content is encapsulated; a communication-network receiving unit that receives, from a communication network, the IP packet of the content; a decapsulation unit that decapsulates the transmission packet received through the broadcast-network receiving unit and extracts the IP packet of the content; an extracting unit that extracts information that is added to a header of the IP packet and concerns a condition of a receiving side node of the content; and a selecting unit that selects, for reception, the IP packet for which the information concerning the condition of the receiving side node matches a predetermined condition.

A content transmitting method according to the invention of claim 4, includes an IP packetizing step of packetizing content and adding an IP header to the content; a communication-network transmitting step of transmitting, through a communication network, the content packetized at the IP packetizing step; an encapsulating step of encapsulating the content packetized at the IP packetizing step to generate a transmission packet to be transmitted through a broadcast network for digital broadcast; and a broadcast-network transmitting step of transmitting the transmission packet encapsulated at the encapsulating step, in which a plurality of content items are transmitted by IP multicast at the communication-network transmitting step and the broadcast-network transmitting step, and information concerning a condition of a receiving side node of the content is added to a header of the content to be IP packetized at the IP packetizing step.

A content receiving method according to the invention of claim 5, includes a broadcast-network receiving step of receiving, from a broadcast network, a transmission packet in which an IP packet of content is encapsulated; a communication-network receiving step of receiving, from a communication network, the IP packet of the content; a decapsulation step of decapsulating the transmission packet received through the broadcast-network receiving step, and extracting the IP packet of the content; an extracting step of extracting information that is added to a header of the IP packet and concerns a condition of a receiving side node of the content; a selecting step of selecting, for reception, the IP packet for which the information concerning the condition of the receiving side node matches a predetermined condition.

EFFECT OF THE INVENTION

According to the content transmitting apparatus, the content receiving apparatus, the content transmitting method, and the content receiving method of the present invention, on the receiving side, the most preferable content can be viewed without the selection of a channel, and on the transmitting side, content corresponding to attributes and circumstances of each user can be transmitted.

BRIEF DESCRIPTION OF DRAWINGS

FIG. 1 is an explanatory diagram of an example of a configuration of a content transmitting apparatus and a content receiving apparatus according to the present invention;

FIG. 2 is a block diagram of a configuration of a content transmitting unit;

FIG. 3-1 is an explanatory diagram of an example of a configuration of packets;

FIG. 3-2 is an explanatory diagram of an outline of a packet;

FIG. 3-3 is an explanatory diagram of an example of preferred recipient information;

EXPLANATIONS OF LETTERS OR NUMERALS

Figures 1, 3:
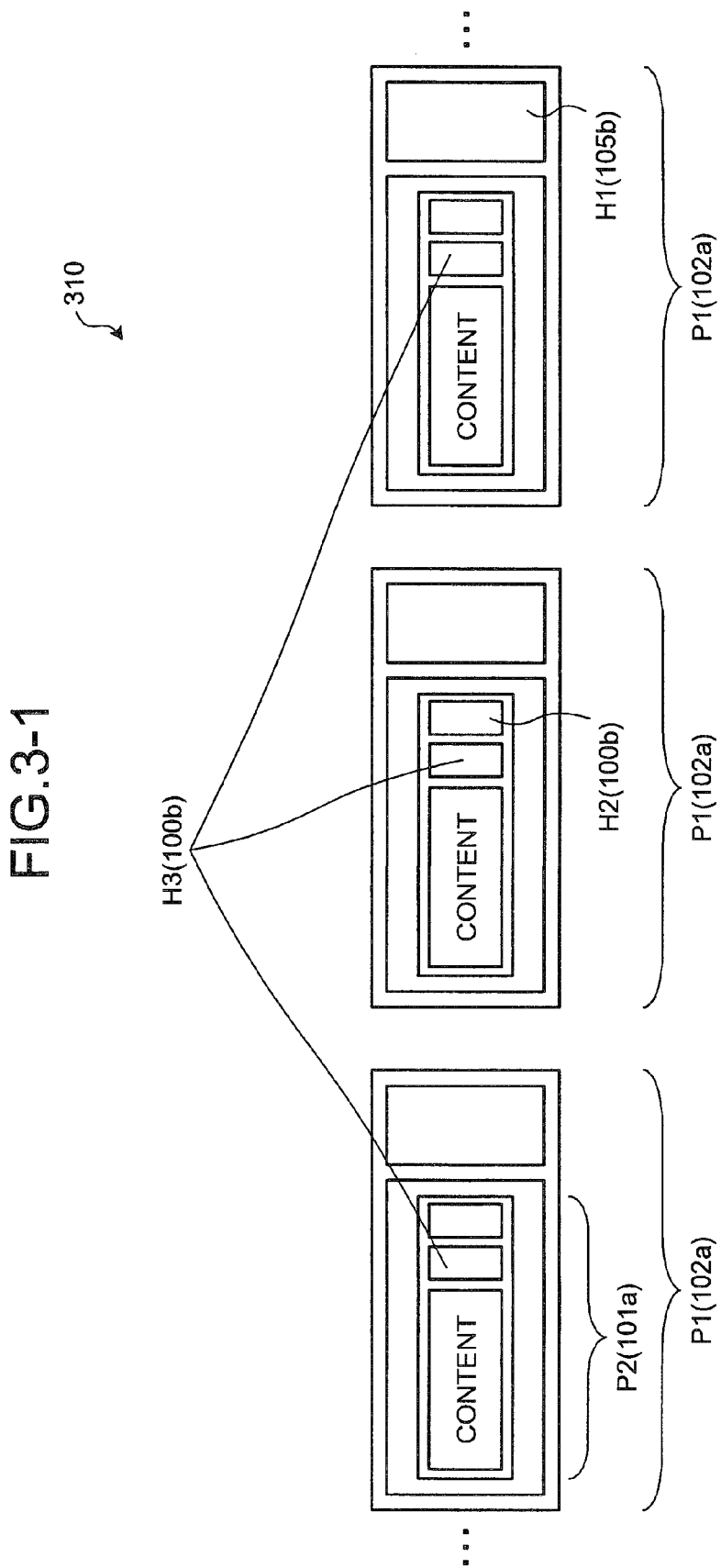

101 communication network
102 broadcast network
110 content transmitting apparatus
111 content transmitting unit
112 encapsulating unit
120 content receiving apparatus
201 content generating unit
202 header adding unit
203 transmitting unit
500 packet judging unit
501 packet receiving unit
502 comparison-information receiving unit
503 preferred-recipient-information comparing unit
504 packet assembling unit
505 content playing unit

BEST MODE(S) FOR CARRYING OUT THE INVENTION

Referring to the accompanying drawings, exemplary embodiments of the content transmitting apparatus, the content receiving apparatus, the content transmitting method, and the content receiving method according to the present invention are explained in detail below.

Embodiment

FIG. 1 is an explanatory diagram of an example of a configuration of a content transmitting apparatus and a content receiving apparatus according to the present invention. A content transmission system 100 shown in FIG. 1 includes, on a broadcast station side, a content transmitting apparatus 110 that transmits content, and on a user side, a content receiving apparatus 120 that receives the content.

A transmitting unit 111 included in the content transmitting apparatus 110 transmits packetized content. The content includes, for example, broadcasted programs, playback data stored in a recording medium such as a DVD, etc. and is not limited to a combination of image signals and audio signals from a camera or a microphone such as for a TV program, but may include only image signals or audio signals of still images or moving images, or only data.

As explained, according to the conventional technique, in a communication network 101 and a broadcast network 102, the content transmitting apparatus 110 is required for each. However, in the embodiment, when content is transmitted to the content receiving apparatus 120 on the user side through the communication network 101, the content transmitting unit 111 transmits packetized content in the state of a packet 101*a* through the communication network 101. The packet 101*a* includes a payload 100*a* that stores content and a header 100*b* that stores protocol information for the packet and addresses. All the content transmitted by the content transmitting unit 111 is in the state of the packet 101*a*.

When content is transmitted to the content receiving apparatus 120 on the user side through the broadcast network 102, the content transmitting unit 111 outputs the packetized content to the encapsulating unit 112. The encapsulating unit 112 encapsulates the content output from the content transmitting unit 111, i.e., the packet 101*a* to be transmitted to the broadcast network 102 is encapsulated into the state of a packet 102*a*. The packet 102*a* has a payload 105*a* that includes the packet 101*a* (including the payload 100*a* and the header 100*b*) and a header 105*b*.

When the content receiving apparatus 120 of each user receives the content through the communication network 101, a communication-network receiving terminal 121 receives the packet 101*a*, assembles the content based on the data therein, and plays the content. When the content receiving apparatus 120 receives the content through the broadcast network 102, the broadcast-network receiving terminal 122 receives the packet 102*a*, decapsulates the packet 102*a*, assembles the content based on the data in the packet 101*a*, and plays the content.

For example, in the case of the transmission format of MPEG2-TS, an IP packet (the payload 100*a* and the header 100*b*) is inserted into a payload of the MPEG2-TS (the payload 105*a*), and a header of the MPEG2-TS (the header 105*b*) is added and the MPEG2-TS is transmitted to the broadcast-network receiving terminal 122 of the content receiving apparatus 120 through the broadcast network 102. The broadcast-network receiving terminal 122 extracts the IP packet (the payload 100*a*) from the received packet of the MPEG2-TS (the packet 102*a*), and plays the received content.

According to the configuration above, there is no need of a broadcast-service playing apparatus conventionally used for broadcast network 102 such as a broadcast receiving device (specifically, a tape deck and a digital player, etc.).

The content receiving apparatus 120 may accommodate either the communication-network terminal 121 or the broadcast-network receiving terminal 122, or both the communication-network terminal 121 and the broadcast-network receiving terminal 122.

Figures 2, 3:
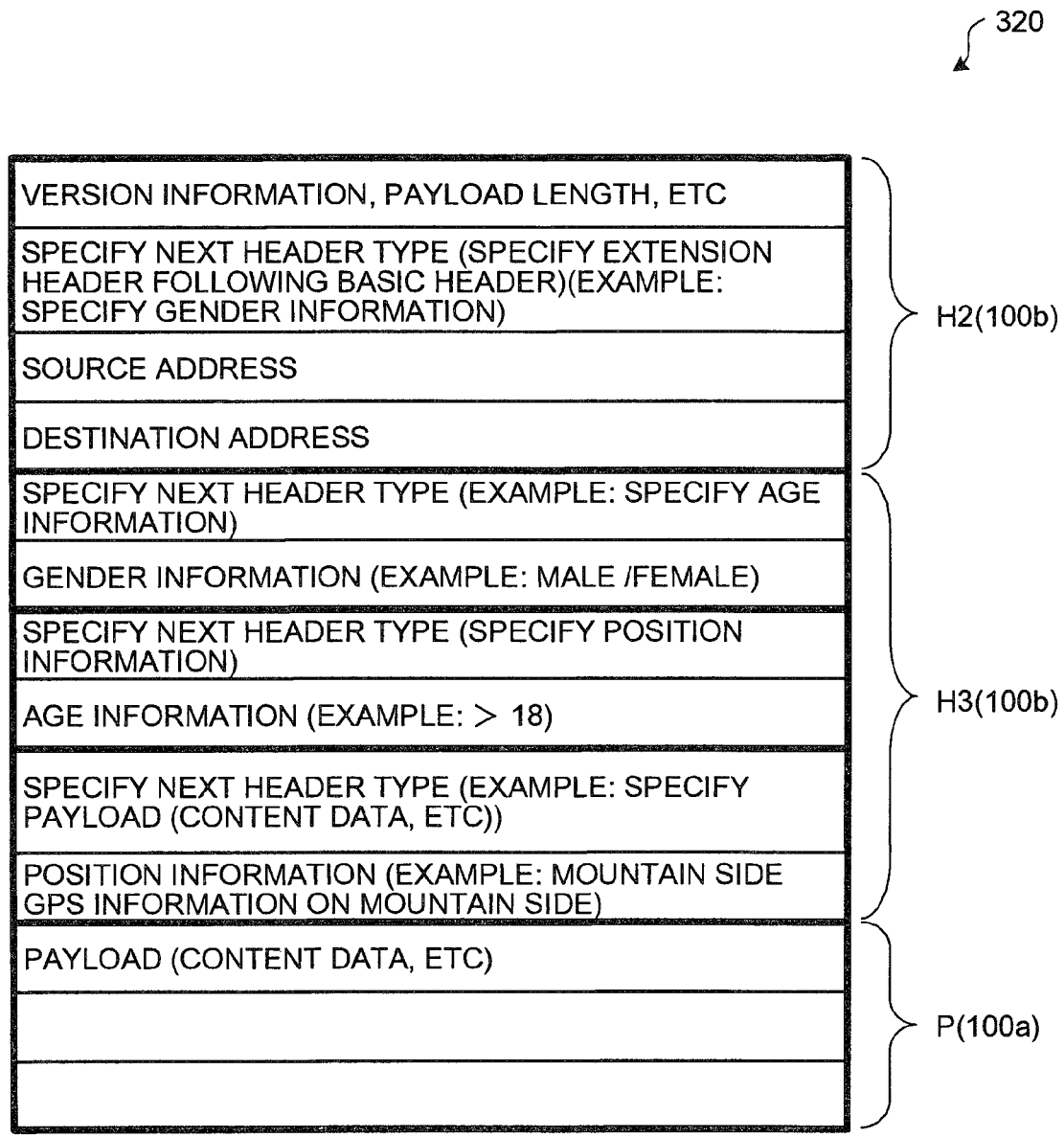
Figure 3:
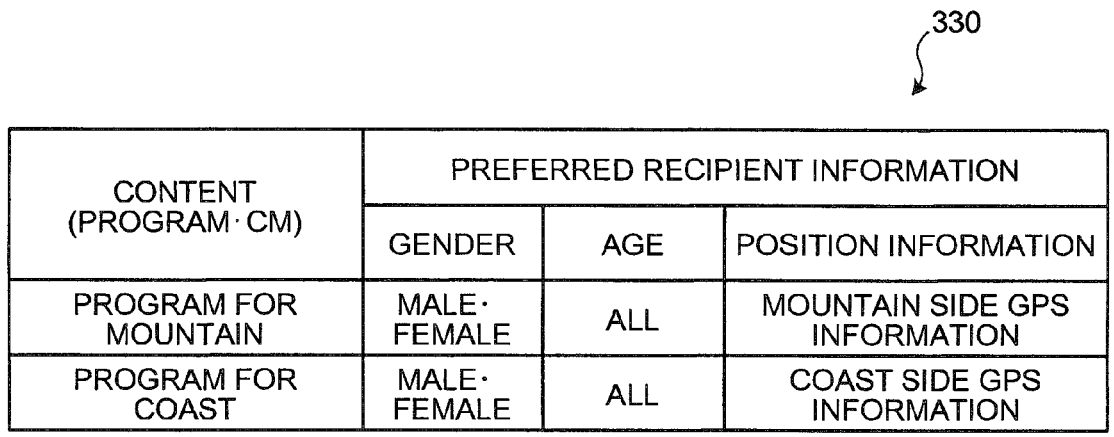

FIG. 2 is a block diagram of a configuration of the content transmitting unit. The content transmitting unit 111 includes content generating unit 201, a header adding unit 202, and a transmitting unit 203.

The content generating unit 201 generates plural content items to be transmitted from the content transmitting apparatus 110 to the content receiving apparatus 120 of each user. Additionally, the content generating unit 201 may sequentially receive generated content items from an external device. The content generating unit 201 prepares content items according to the position (current position) of a recipient, a recipient attribute, and a recipient preference.

The header adding unit 202 adds basic headers and extension headers to packets of the content generated by the content generating unit 201. The packets of the content and the extension headers are explained hereinafter. The transmitting unit 203 transmits, to the content receiving apparatus 120 of a user, the content to which the basic headers and the extension headers have been added.

FIG. 3-1 is an explanatory diagram of an example of a configuration of the packets. A packet model 310 shown in FIG. 3-1 is an example of the content transmission method according to the present invention, and shows a state of the content upon being transmitted by the encapsulating unit 112 to the broadcast network 102. An IP packet P2 includes content, an IP basic header H2, and an extension header H3. An MPEG2-TS header H1 is added to the IP packet P2, which is regarded as a payload to be encapsulated, and resulting packet is transmitted to the broadcast network 102 as an MPEG2-TS packet P1.

As a result, the IP packet transmitted from the content transmitting unit 111 shown in FIG. 2 is in the state of the IP packet P2, in which the IP basic header H2 and the extension header H3 has been added by the header adding unit 202. Referring to FIG. 3-2, the IP packet P2 is explained in detail.

FIG. 3-2 is an explanatory diagram of an outline of a packet. A diagram 320 illustrates an outline of an IPv6 packet used in the embodiment. The IPv6 packet includes an IP basic header H2, an extension header H3 (may be plural), and a payload P. Referring to FIG. 3-3, a specific example of information added to the extension header H3 is explained.

FIG. 3-3 is an explanatory diagram of an example of preferred recipient information. A diagram 330 shown in FIG. 3-3 illustrates an example of preferred recipient information added to the extension header H3 of the content. In the shown example, the preferred recipient information includes gender, age, and position information.

Figure 4:
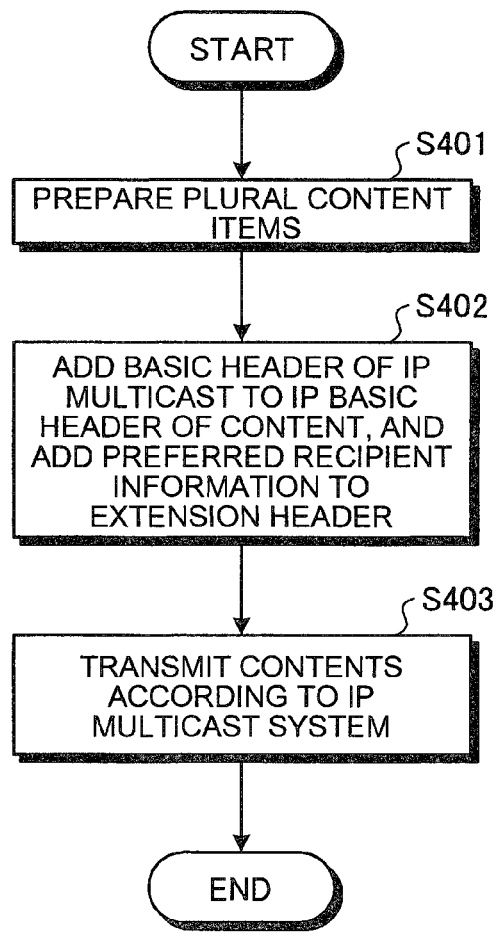
FIG. 4 is a flowchart of a content transmission process performed by the content transmitting apparatus.

FIG. 4 is a flowchart of a content transmission process performed by the content transmitting apparatus. The content generating unit prepares plural content items (step S401). The content items include plural programs and commercial messages focusing on a particular recipient group. For example, in the case of classifying the recipient group by region, content including local information may be generated for each region, and in the case of classifying the recipient group by age, content may be generated reflecting the preferences of recipients of the same age.

The header adding unit 202 adds a basic header of the IP multicast to the IP basic header H2 of each content (see FIGS. 3-1 and 3-2), and preferred recipient information to the extension header H3 (step S402). The transmitting unit 203 transmits the content items according to the IP multicast system (step S403), and the content transmission process ends.

Figure 5:
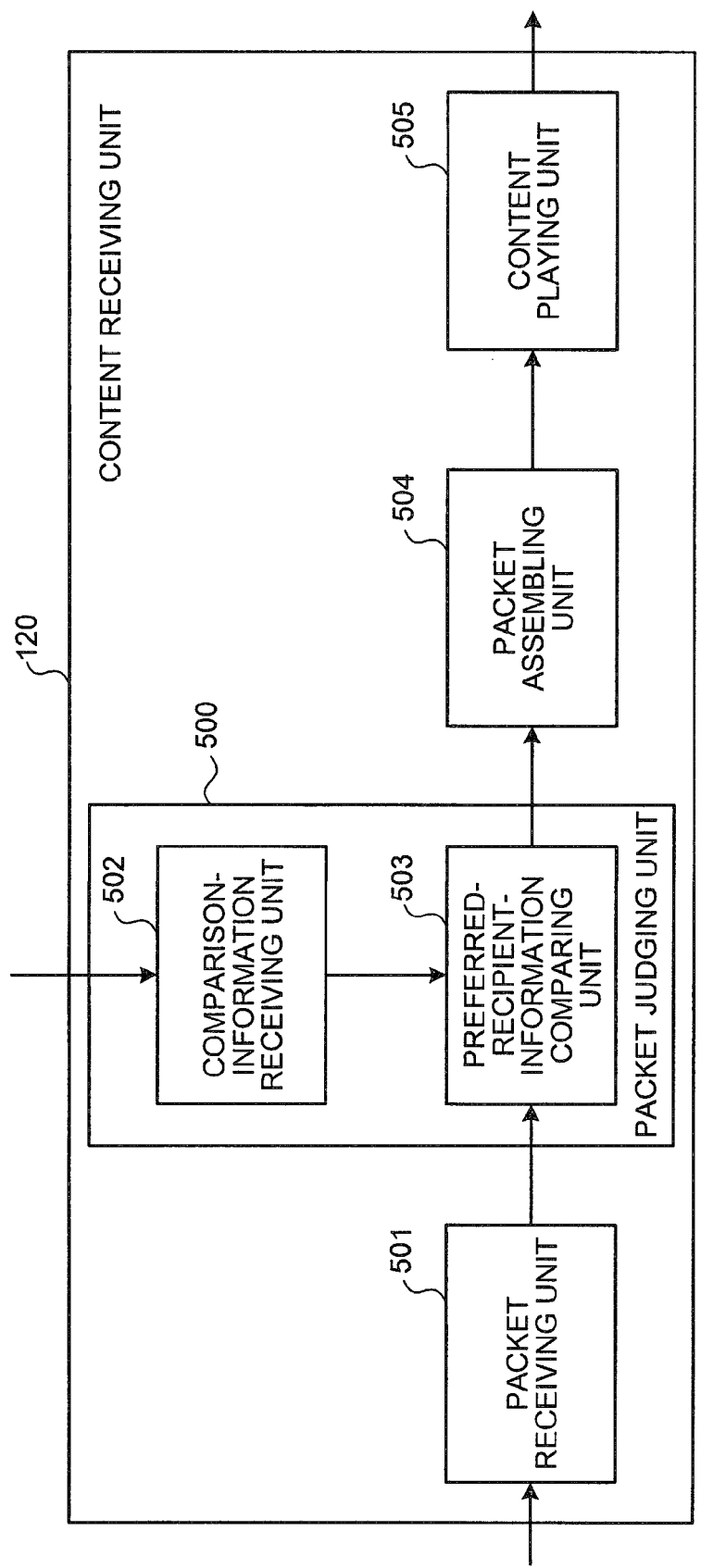
FIG. 5 is a block diagram of a configuration of a content receiving apparatus.

FIG. 5 is a block diagram of a configuration of the content receiving apparatus. The content receiving apparatus 120 includes a packet judging unit 500, a packet receiving unit 501, a packet assembling unit 504, and content playing unit 505. The packet judging unit 500 includes a comparison-information receiving unit 502 and a preferred-recipient information comparing unit 503.

The packet receiving unit 501 receives and outputs the packets transmitted by the content transmitting apparatus 110 to the preferred-recipient-information comparing unit 503. The comparison-information receiving unit receives, as information for comparison, recipient information concerning the user of the content receiving apparatus 120, such as user attribute information input by the user, and position information concerning the content receiving apparatus 120 calculated based on GPS signals. The information received for comparison is output to the preferred-recipient-information comparing unit 503.

The preferred-recipient-information comparing unit 503 compares the preferred recipient information added to the extension header H3 of the packet received from the packet receiving unit 501 and the recipient information received from the comparison-information receiving unit 502 as the information for comparison, and judges whether the received packet is suitable for the user of the content receiving apparatus 120. When it is judged that the received packet is suitable for the user, the received packet is output to the packet assembling unit 504. On the contrary, when it is judged that the received packet is not suitable for the user, the received packet is discarded.

The packet assembling unit 504 receives the packet that is judged to be suitable for the user of the content receiving apparatus 120. Packets satisfying reception conditions are stored in a buffer and payloads of the packets are appropriately connected. The content playing unit 505 plays, as the content, the packets assembled by the packet assembling unit 504.

Figure 6:
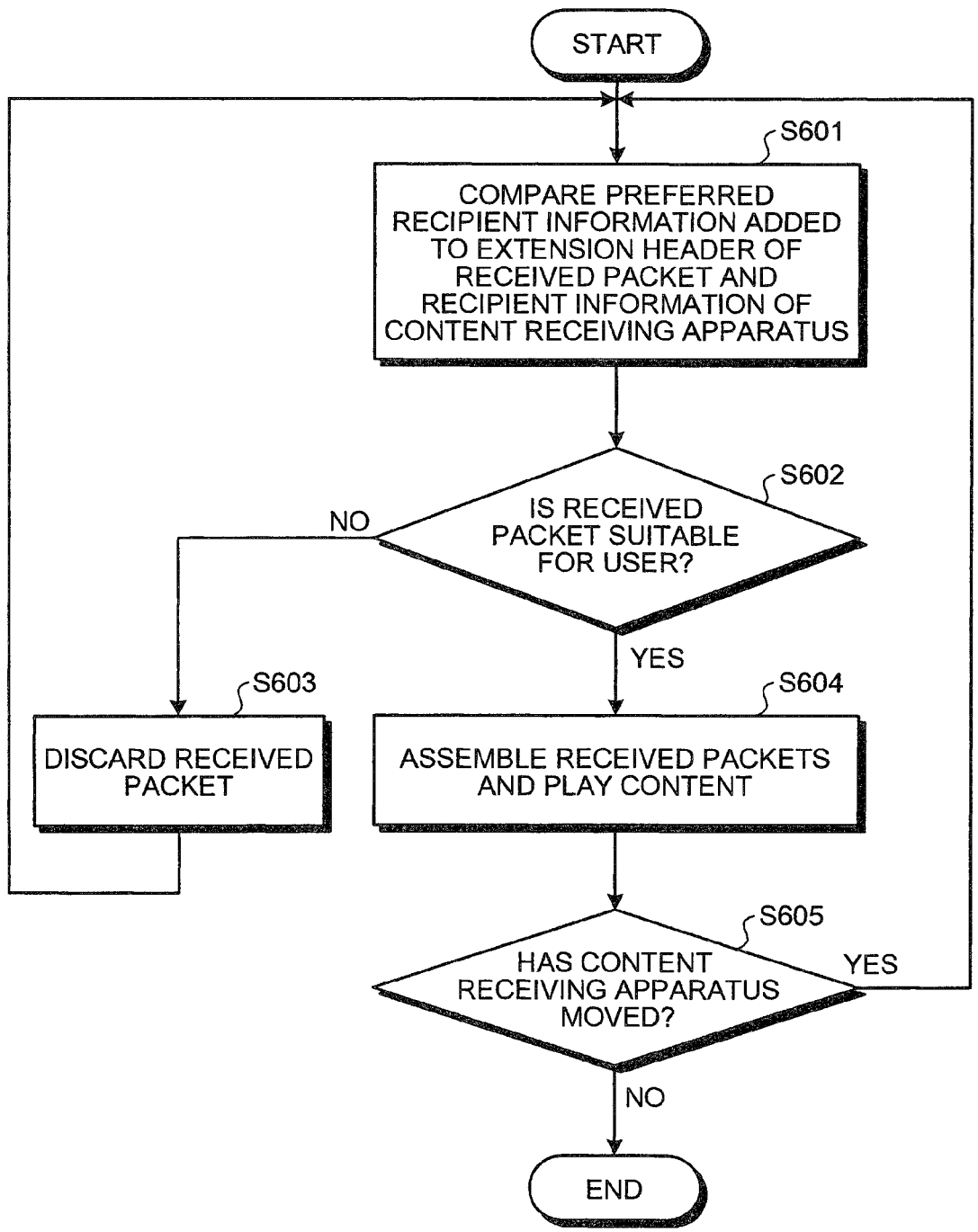
FIG. 6 is a flowchart of a content receiving process performed by the content receiving apparatus.

FIG. 6 is a flowchart of a content receiving process performed by the content receiving apparatus. The preferred recipient information in the extension header H3 of the received packet and the recipient information of the content receiving apparatus 120 are compared (step S601). It is judged based on a comparison result whether the received packet is suitable for the user of the content receiving apparatus 120 (step S602).

When it is judged that the received packet is not suitable for the user of the content receiving apparatus 120 (step S602: NO), the received packet is discarded (step S603), and the process returns to step S601 to repeat the same processing for another received packet. When it is judged that the received packet is suitable for the user of the content receiving apparatus 120 (step S602: YES), the received packets are assembled to play the content (step S604). Thus, by evaluating the packets received, the reception of the content is judged.

It is judged whether the content receiving apparatus 120 has moved (step S605). When the content receiving apparatus 120 has not moved (step S605: NO), since the position information received by the comparison-information receiving unit does not change, the content received and played for the user is the content selected based on the same preferred recipient information, and the content reception process ends.

On the contrary, when the content receiving apparatus 120 has moved (step S605: YES), since the position information received by the comparison-information receiving unit changes, the process returns to step S601, receives another packet, judges whether the received packet is suitable for the user, and performs processing based on the judgment.

According to the embodiment explained above, by using the IP multicast system, plural content items can be simultaneously transmitted from the same content transmitting apparatus of a broadcast station. Furthermore, the content most suitable for a user can be automatically received by the user through the transmission of the preferred recipient information using the extension header of the IP packet. Moreover, the receiving of the packets by the content receiving apparatus 120 can be dynamically changed by changing and transmitting the reception conditions of the extension header H3 (the preferred recipient information).

As explained above, according to the content transmitting apparatus, the content receiving apparatus, the content transmitting method, and the content receiving method of the present invention, if an area has the content receiving apparatus, a program suitable for the area can be identified automatically. For example, in the case of an emergency broadcast for an area affected by a disaster, a user can effectively receive pertinent information by a transmission of detailed information for each devastated area.

Furthermore, a broadcast station can provide plural programs corresponding to viewer preference. For example, when transmitting a commercial, commercials for different products of a given sponsor can be provided according to the viewer, achieving effective target marketing.

The content transmitting method and content receiving method explained in the present embodiment can be implemented by a computer such as a personal computer and a workstation executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

INDUSTRIAL APPLICABILITY

As explained above, the content transmitting apparatus, the content receiving apparatus, the content transmitting method, and the content receiving method of the present invention are useful in a broadcast network and a communication network that simultaneously distribute broadcast programs to plural terminal devices, particularly for an apparatus and a terminal device that respectively transmits and receives broadcast content through a broadcast network such as that for a satellite digital broadcast and a terrestrial digital broadcast, and a communication network such as the Internet.

The invention claimed is:

1. A content transmitting and receiving system comprising:
a content transmitting apparatus having:
an IP packetizing unit that packetizes content into an IP packet and adds an IP header to the IP packet;
a communication-network transmitting unit that transmits the IP packet through a communication network;
an encapsulating unit that encapsulates the IP packet into a transmission packet; and
a broadcast-network transmitting unit that transmits the transmission packet through a broadcast network for digital broadcast,
wherein the communication-network transmitting unit and the broadcast-network transmitting unit transmit a plurality of content items by IP multicast, and the IP packetizing unit adds information concerning a condition of a receiving side node for the content to the IP header, said information including a current position of a user on the receiving side, a recipient attribute, or a recipient preference; and
a content receiving apparatus, including:
a communication-network receiving unit that receives the IP packet from the communication network;
a broadcast-network receiving unit that receives the transmission packet from the broadcast network;
a decapsulation unit that decapsulates the transmission packet received by the broadcast-network receiving unit and extracts the IP packet;
an extracting unit that extracts the information concerning the condition of the receiving side node for the content added to the IP header of the IP packet; and
a preferred-recipient-information comparing unit that compares the information concerning the condition of the receiving side node for the content with a predetermined condition, outputs the content of the IP packet to the user when the information matches the predetermined condition, and discards the IP packet when the information does not match the predetermined condition.

2. The content transmitting and receiving system according to claim 1, wherein the IP packetizing unit adds said information to an extension header of the IP header.

3. The content receiving and receiving system according to claim 2, wherein the extracting unit extracts said information from an extension header of the header of the IP packet.

4. The content transmitting and receiving system according to claim 1, further comprising a content generating unit that prepares the content to be transmitted by classifying a recipient group for the content using said information.

5. A content transmitting and receiving method comprising:
a content transmitting method, including:
an IP packetizing step of packetizing content into an IP packet and adding an IP header to the content;
a communication-network transmitting step of transmitting the IP packet through a communication network;
an encapsulating step of encapsulating the IP packet into a transmission packet to be transmitted through a broadcast network for digital broadcast; and
a broadcast-network transmitting step of transmitting the transmission packet,
wherein a plurality of content items are transmitted by IP multicast at the communication-network transmitting step and the broadcast-network transmitting step, and information concerning a condition of a receiving side node for the content is added to the IP header at the IP packetizing step, said information including a current position of a user on the receiving side, a recipient attribute, or a recipient preference; and
a content receiving method, including:
a communication-network receiving step of receiving the IP packet from the communication network;
a broadcast-network receiving step of receiving the transmission packet from the broadcast network;
a decapsulation step of decapsulating the transmission packet received through the broadcast-network receiving step, and extracting the IP packet;
an extracting step of extracting the information concerning the condition of the receiving side node for the content from the IP header of the IP packet; and
a comparing step of comparing the information concerning the condition of the receiving side node for the content with a predetermined condition, outputs the content of the IP packet to the user when the information matches the predetermined condition, and discards the IP packet when the information does not match the predetermined condition.

6. The content transmitting and receiving method according to claim 5, wherein the IP packetizing step adds said information to an extension header of the IP header.

7. The content receiving and receiving method according to claim 6, wherein the extracting step extracts said information from an extension header of the header of the IP packet.

8. The content transmitting and receiving method according to claim 5, further comprising a content generating step of preparing the content to be transmitted by classifying a recipient group for the content using said information.

9. A non-transient computer readable medium having a program that executes on one or more computers, causing the one or more computers to carry out a content transmitting method and a content receiving method, the content transmitting method including:
    an IP packetizing step of packetizing content into an IP packet and adding an IP header to the content;
    a communication-network transmitting step of transmitting the IP packet through a communication network;
    an encapsulating step of encapsulating the IP packet into a transmission packet to be transmitted through a broadcast network for digital broadcast; and
    a broadcast-network transmitting step of transmitting the transmission packet,
wherein a plurality of content items are transmitted by IP multicast at the communication-network transmitting step and the broadcast-network transmitting step, and information concerning a condition of a receiving side node for the content is added to the IP header at the IP packetizing step, said information including a current position of a user on the receiving side, a recipient attribute, or a recipient preference; and the content receiving method including:
    a communication-network receiving step of receiving the IP packet from the communication network;
    a broadcast-network receiving step of receiving the transmission packet from the broadcast network;
    a decapsulation step of decapsulating the transmission packet received through the broadcast-network receiving step, and extracting the IP packet;
    an extracting step of extracting the information concerning the condition of the receiving side node for the content from the IP header of the IP packet; and
    a comparing step of comparing the information concerning the condition of the receiving side node for the content with a predetermined condition, outputs the content of the IP packet to the user when the information matches the predetermined condition, and discards the IP packet when the information does not match the predetermined condition.

* * * * *